Oct. 19, 1948.   C. H. SUTHERLAND   2,451,990
DOUBLE ELECTRIC MOTOR DRIVING MEANS
Filed Oct. 24, 1945
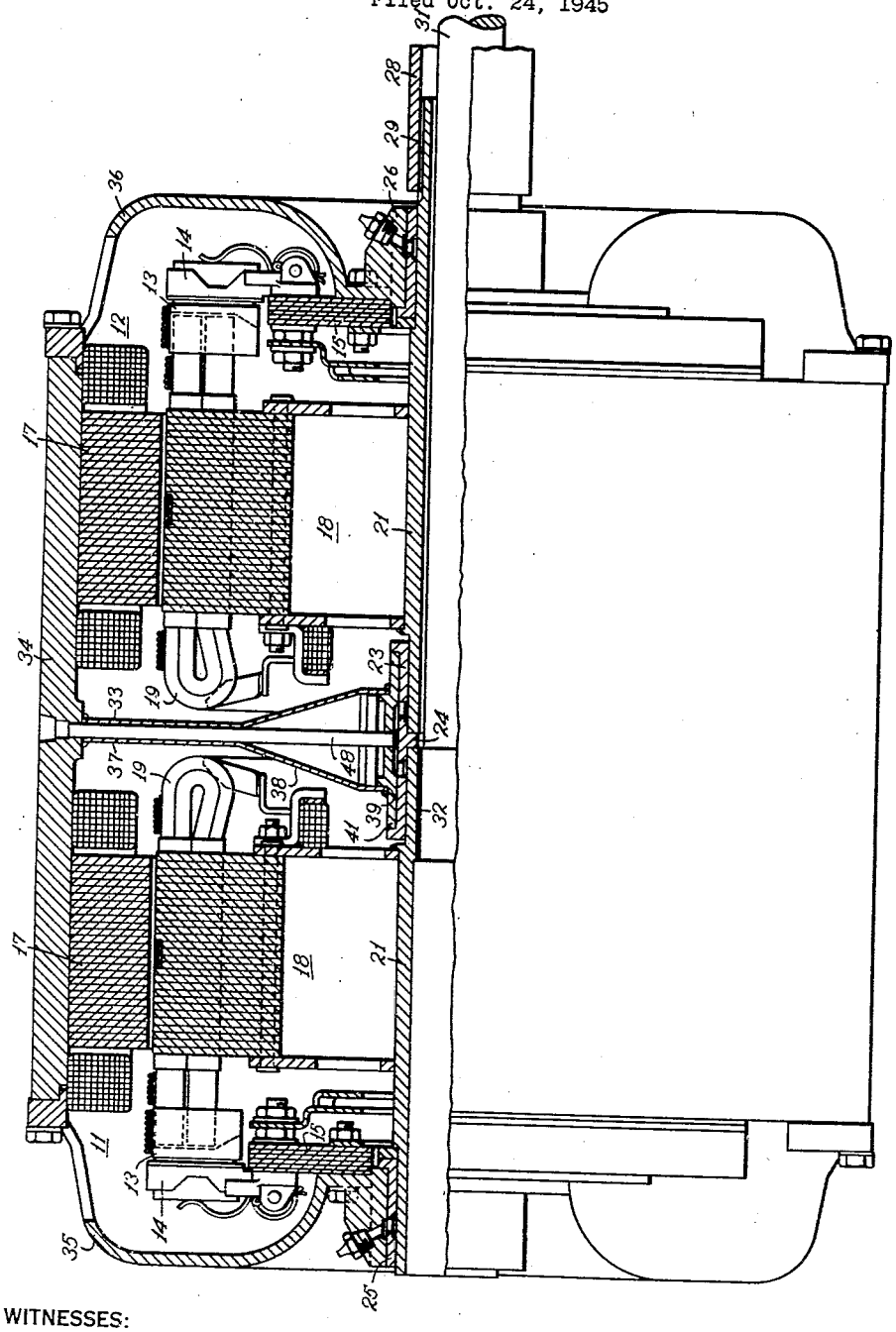
WITNESSES:
Edward Michaels
INVENTOR
Carl H. Sutherland.
BY
O. B. Buchanan
ATTORNEY

UNITED STATES PATENT OFFICE 2,451,990

DOUBLE ELECTRIC MOTOR DRIVING MEANS

Carl H. Sutherland, Forest Hills, Pa., assignor to Westinghouse Electric Corporation, East Pittsburgh, Pa., a corporation of Pennsylvania Application October 24, 1945, Serial No. 624,288

1 Claim. (Cl. 172—36)

My invention relates to the bearing arrangements and the drive take-off for a double electric motor or other machines for driving, or being driven by, two concentric shafts rotating in opposite directions.

The object of my invention is to provide a novel design of this type, which combines sturdiness and simplicity with the lightest weight possible.

An exemplary form of embodiment of my invention is shown in the drawing, the single figure of which is a side elevational view, partly in section, illustrating my invention in a preferred form of embodiment.

My invention is illustrated, in the drawing, in the form of a double electric-motor driving-means, for use in driving two propeller-shafts in opposite directions of rotation, or for any other purposes. I have shown two identical electric motors 11 and 12, which are mounted coaxially, and which are disposed in back-to-back arrangement, so that the motors rotate in opposite directions, although they are identical in construction, thus saving motor-costs by making them identical.

I have chosen, for illustration, direct-current motors of a type having radial commutators 13, and radially disposed brushholders 14 which are carried by brushholder-supporting rings 15, as described and claimed in a patent-application of R. E. Rambo and C. F. Jenkins, Serial No. 624,287, filed October 24, 1945, and assigned to the Westinghouse Electric Corporation. However, it is to be understood that any desired types of motors might be utilized, or, for that matter, any two axially aligned machines having rotating motions in opposite directions.

Each motor 11 and 12 consists of a stator member 17 and a rotor member 18, the latter having a commutator-type armature-winding 19, which is associated with the previously mentioned radial commutator 13. The rotor member 18 of each machine is provided with a hollow shaft 21.

A common centrally disposed bearing 23 is provided, for journalling the inner ends of both of the hollow shafts 21, and for providing a thrust-bearing 24 for engaging the inner ends of both of said hollow shafts. A separate outer journal bearing is provided for the outer end of each of the hollow shafts 21, as shown at 25 and 26.

The driven apparatus (not shown), which is driven by the right-hand motor 12, is driven by an extension of the hollow shaft 21 of that motor, this shaft-extension being illustrated in the form of a separate hollow shaft 28, which is splined at 29 to the outer periphery of the hollow shaft 21 of said right-hand motor. The driven apparatus (not shown), which is driven by the left-hand motor 11, is driven by means of an inner shaft 31, which extends through the hollow shaft-extension 28 and the hollow shaft 21 of the right-hand motor, and which is splined, at 32, to the inside of the hollow shaft 21 of the left-hand motor.

A rigid supporting-means is provided, for supporting the two stator members 17 and the three bearings 23, 25 and 26. The drawing shows a special form of central-bearing housing or support 33, which is more particularly described and claimed in an application of E. O. Mueller, Serial No. 624,289, filed October 24, 1945, assigned to the Westinghouse Electric Corporation. The general supporting-means comprises a hollow, double-motor frame 34, which extends over the stator members 17 of both machines. Before the stator members 17 are assembled within the hollow frame 34, the central bearing-housing 33 is secured centrally within said hollow frame. This central bearing-housing supports the central bearing 23. The two outer bearings 25 and 26 are carried by two end-brackets 35 and 36, respectively, which are carried by the hollow frame 34.

The central bearing-housing 33 has a special construction, which is designed for light weight and rigidity, in a space requiring the smallest possible axial length of the double-motor unit, and it constitutes the one of the special objects of the aforesaid Mueller application. This central bearing-housing 33 comprises two closely spaced discs 37 which are outwardly dished, near the center, as indicated at 38, the centers of the two discs being bored, as indicated at 39, to receive the hub 41 of the centrally disposed bearing 23.

The center bearing 23 is lubricated through a pipe 48 which extends from the hub 41 of said bearing to the outer periphery of the discs 37, and preferably into or through the outer frame-housing 34, so that the top of the lubricating pipe 48 is accessible at the top of the twin-motor assembly.

It will be noted that my novel construction consists of a double-motor unit having opposite-directional drives, in a compact construction in which an extremely light weight is combined with exceptional rigidity, while the overall space-requirements are kept to a minimum.

I claim as my invention:

A combination comprising two axially aligned machines, each machine having a stator member and a rotor member, each rotor member having a hollow shaft, the two rotor members rotating in opposite directions, a centrally disposed bearing for journalling the inner ends of both of said hollow shafts and for providing thrust-bearing support for both of said inner ends, a separate outer journal bearing for the outer end of each of said hollow shafts, an inner shaft extending through one of said hollow shafts and having a drive-connection to the inside of the other hollow shaft, and a rigid supporting-means for supporting the two stator members and the three bearings.

CARL H. SUTHERLAND.

REFERENCES CITED

The following references are of record in the file of this patent:

UNITED STATES PATENTS

| Number | Name | Date |
| --- | --- | --- |
| 740,945 | Taplin | Oct. 6, 1903 |
| 938,911 | Taylor | Nov. 2, 1909 |
| 1,586,184 | Dick et al. | May 25, 1926 |